(12) United States Patent
Morita et al.

(10) Patent No.: US 7,769,511 B2
(45) Date of Patent: Aug. 3, 2010

(54) VEHICLE CONTROL APPARATUS HAVING EVENT MANAGEMENT UNIT

(75) Inventors: Yuichiro Morita, Hitachi (JP); Fumio Narisawa, Hitachinaka (JP); Koji Hashimoto, Hitachinaka (JP); Nobuhisa Motoyama, Hitachinaka (JP); Junji Miyake, Hitachinaka (JP); Hideyuki Hara, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 719 days.

(21) Appl. No.: 11/655,127

(22) Filed: Jan. 19, 2007

(65) Prior Publication Data
US 2007/0174373 A1    Jul. 26, 2007

(30) Foreign Application Priority Data
Jan. 26, 2006    (JP) .............................. 2006-018016

(51) Int. Cl.
*G04F 3/00* (2006.01)
*G06F 19/00* (2006.01)
(52) U.S. Cl. .............................. 701/36; 701/29; 701/33
(58) Field of Classification Search ................... 701/36, 701/1, 29, 33
See application file for complete search history.

(56) References Cited

U.S. PATENT DOCUMENTS

| 4,760,275 | A | 7/1988 | Sato et al. |
| 5,719,771 | A | 2/1998 | Buck et al. |
| 6,122,572 | A * | 9/2000 | Yavnai .......................... 701/23 |
| 6,374,161 | B1 * | 4/2002 | Iwai et al. ....................... 701/1 |
| 6,438,462 | B1 | 8/2002 | Hanf et al. |
| 6,981,176 | B2 * | 12/2005 | Fruehling et al. ............. 714/11 |
| 2002/0035650 | A1 | 3/2002 | Nakamoto et al. |
| 2002/0040261 | A1 | 4/2002 | Nakamoto et al. |
| 2003/0036843 | A1 | 2/2003 | Okude et al. |
| 2004/0215982 | A1 | 10/2004 | Subramanian et al. |
| 2005/0190467 | A1 | 9/2005 | Noguchi |

OTHER PUBLICATIONS

"New Serial Microcontroller Links—Micro-Link-Interface and Micro-Second-Channel", SAE-2003-01-0112; Klaus Scheibert, Jens Barrenscheen and Hannes Esti; 2003 (8 pages).
European Search Report dated Apr. 5, 2007 (Ten (10) Pages).

* cited by examiner

*Primary Examiner*—Tan Q Nguyen
(74) *Attorney, Agent, or Firm*—Crowell & Moring LLP

(57) ABSTRACT

In a vehicle control apparatus having an arithmetic processing unit including an arithmetic unit, a storage unit and a communication unit, and an input/output unit including an signal input unit or a signal output unit and a communication unit, the arithmetic processing unit is connected to the input/output unit via a serial communication line, the input/output unit is equipped with an event management unit for detecting an event of a signal input or a signal output and notifying the event to the arithmetic processing unit; and the arithmetic processing unit is, equipped with an input/output management unit for performing data exchange between the signal input unit or the signal output unit and the storage unit via the communication units, in accordance with a request from the arithmetic unit and an event notice from the event management unit.

7 Claims, 12 Drawing Sheets

FIG.6
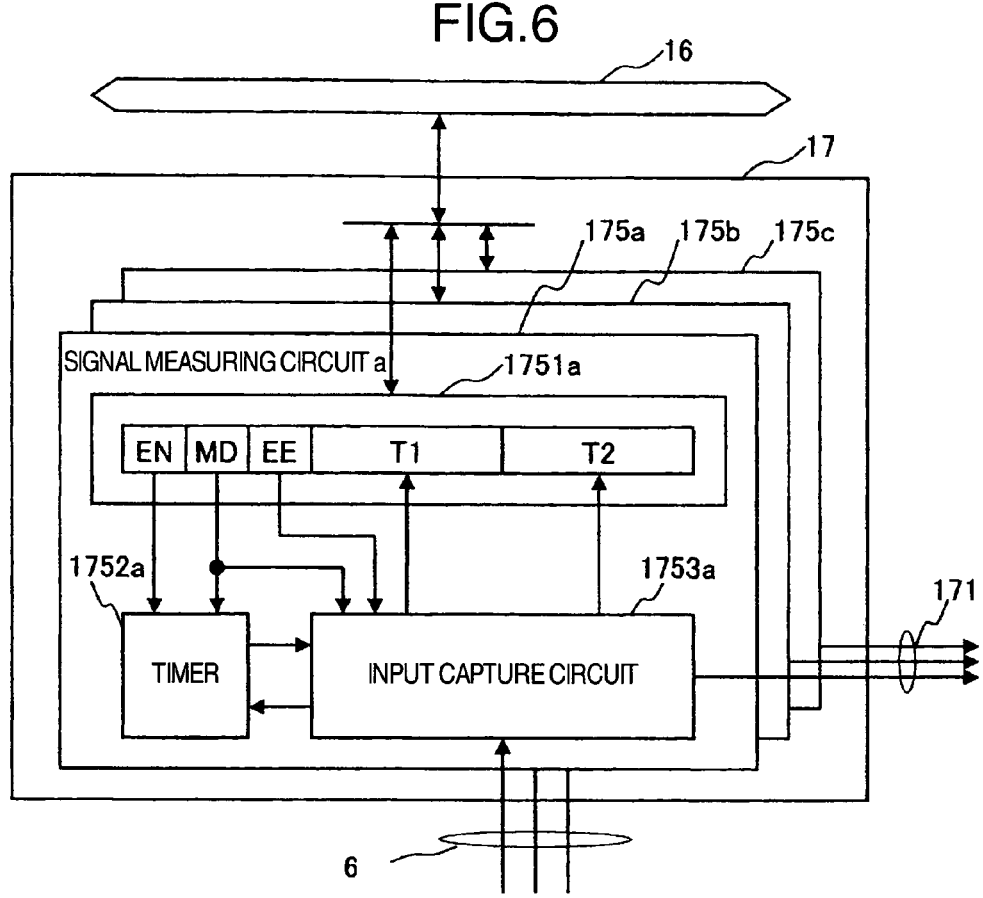
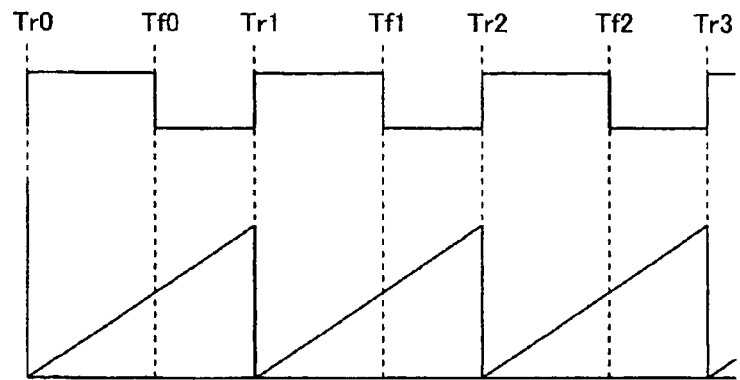
FIG.7A PULSE SIGNAL 6
FIG.7B TIMER 1752a
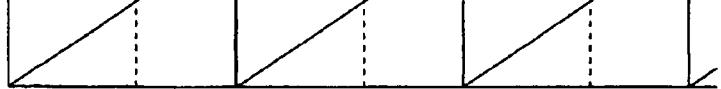
FIG.7C FALL EDGE TIME (T1)
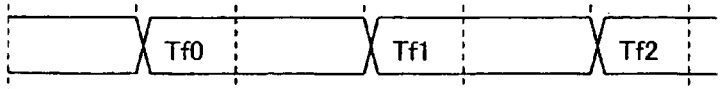
FIG.7D RISE EDGE TIME (T2)
FIG.7E INTERRUPT REQUEST SIGNAL (171)
→ TIME

VEHICLE CONTROL APPARATUS HAVING EVENT MANAGEMENT UNIT

BACKGROUND OF THE INVENTION

The present invention relates to a vehicle control apparatus for conducting driving, steering and braking of a vehicle through electronic control.

Electronic control for vehicles have recently expand rapidly aiming at reduction in fuel consumption and exhaust gas and improvement on safety. Controllers are used in a vehicle for controlling an engine, a transmission, a brake and steering, and in addition an air bag, doors, mirrors and the like. A vehicle is equipped with a number of controllers. Basically, these controllers detect the states of control targets from various sensors and instruction information on a drive from operation switches, and in accordance with the state information and instruction information, control actuators such as electromagnetic valves and motors. A signal output from each sensor includes an analog signal and a pulse signal. Controllers are therefore equipped with an A/D converter for converting an analog signal voltage into a digital value and a timer to be used for converting a period or the like of a pulse signal into a digital value. Since actuators such as electromagnetic valves and motors are controlled by pulse signals such as PWM pulse signals, controllers are equipped with a timer to be used for outputting a pulse signal. Controllers are further equipped with a general I/O port for digital signal inputs/outputs in order to fetch information on operation switches and perform simple ON/OFF control for electromagnetic valves. A general controller uses a microcontroller having a central processor unit (CPU), a memory, A/D converters, timers, general I/O ports and the like respectively integrated on the same chip. The advantages of using a microcontroller are mainly reduction in the number of components and corresponding feasibility of substrate designs. However, the A/D converter, timer, general I/O port and the like have each a number of pins to allow a plurality of signals to be connected. There arises therefore an issue that the chip size and package of a microcontroller cannot be made small even if a chip integration degree is improved by advancement of micro patterning.

To address this issue, a method has been proposed which reduces the number of pins of a microcontroller by connecting the microcontroller, A/D converters and driver ICes through serial communications (refer to "New Serial Microcontroller Links—Micro-Link-Interface And Micro-Second-Channel", SAE-2003-01-0112). According to this method, a driver IC is equipped with a unit for generating a plurality of PWM pulse signals for driving actuators, and ON/OFF commands for the PWM pulse signals generated by using a timer in the microcontroller are transmitted through serial communications to the driver IC which in turn generates the PWM pulse signals.

SUMMARY OF THE INVENTION

With this method, however, since ON/OFF commands for a plurality of PWM pulse signals are time sequentially transferred repetitively through serial communications, the number of signals increases resulting in an issue of a lower resolution of PWM pulses.

The present invention has been made to address this issue, and an object of the present invention is to provide a vehicle control apparatus and an input/output apparatus for the vehicle control apparatus which can obviate the aforesaid problems of the related art.

Another object of the present invention is to connect a microcontroller and a driver IC through serial communications without lowering a resolution of PWM pulse signals, and to allow control application software to be developed easily by reducing dependency upon the microcontroller.

In order to address the above-described issue, the vehicle control apparatus of the present invention comprises an arithmetic processing unit including an arithmetic unit, a storage unit and a communication unit and an input/output unit including an signal input unit or a signal output unit and a communication unit, wherein a serial communication line connect the arithmetic processing unit and the input/output unit, the input/output unit is equipped with an event management unit for detecting an event of a signal input or a signal output and notifying the event to the arithmetic processing unit, and the arithmetic processing unit is equipped with an input/output management unit for performing data exchange between the signal input unit or the signal output unit and the storage unit via the communication units, in accordance with a request from the arithmetic unit and an event notice from the event management unit. Accordingly, the arithmetic processing unit can exchange data with the input/output unit without using the arithmetic processing unit.

In the vehicle control apparatus of the present invention, the input/output management unit transfers information externally detected by the signal input unit to the storage unit, or transfers a signal output command stored in the storage unit to the signal output unit, in accordance with the request from the arithmetic unit and the event notice from the event management unit, and the arithmetic unit reads information on the signal input unit stored in the storage unit or writes the signal output command to the signal output unit in the storage unit. Accordingly, the arithmetic unit can exchange data with the input/output unit only by accessing the storage unit.

In the vehicle control apparatus of the present invention, the arithmetic processing unit includes a data transfer unit, and the input/output management unit supplies the data transfer unit with a command for data transfer between the storage unit and the input/output unit via the communication units. Accordingly, data transfer between the storage unit of the arithmetic processing unit and the input/output unit can be performed automatically.

An input/output apparatus for a vehicle control apparatus of the present invention, the input/output apparatus being connected to an arithmetic processing unit of a vehicle control apparatus by a serial communication path, comprises a signal input unit or a signal output unit and a communication unit, wherein an event management unit detects an event of a signal input or a signal output to the arithmetic processing unit via the communication unit. Accordingly, a process to be executed by the arithmetic processing unit of the vehicle control apparatus can be synchronized with an event of a signal input or a signal output.

In the input/output apparatus for a vehicle control apparatus of the present invention, the event management unit notifies the event by outputting an interrupt signal and an event identification signal to the arithmetic processing unit. Accordingly, the arithmetic processing unit of the vehicle control apparatus can execute a process matching the type of each event.

In the input/output apparatus for a vehicle control apparatus of the present invention, the event management unit sets a priority order for each of the events, and notifies the event in accordance with the priority order. Accordingly, an event occurrence can be notified to the arithmetic processing unit of the vehicle control apparatus in accordance with the priority order of the event.

In the vehicle control apparatus of the present invention, the arithmetic processing unit and input/output unit are connected by a serial communication line so that the number of pins of the arithmetic processing unit can be reduced. Since the input/output unit is equipped with an event management unit and a copy of a control register in the input/output unit is realized in the memory unit of the arithmetic processing unit, application software can perform I/O operations and data read by normal memory access without accessing the input/output device driver IC. Therefore, the arithmetic processing unit and input/output unit can be connected by the serial communication line without lowering a resolution of PWM pulse signals. Further, control application software can be developed easily. Furthermore, since the arithmetic processing unit is equipped with the input/output management unit, the input/output process by the arithmetic unit is not necessary so that a load on CPU can be reduced.

Other objects, features and advantages of the invention will become apparent from the following description of the embodiments of the invention taken in conjunction with the accompanying drawings.

BRIEF DESCRIPTION OF THE DRAWINGS

FIG. 6 is a block diagram of a signal measuring unit 17.

FIGS. 7A to 7E are timing charts illustrating the operation of the signal measuring unit 17.

DETAILED DESCRIPTION OF THE EMBODIMENT

Embodiments of a vehicle control apparatus of the present invention will now be described with reference to the accompanying drawings.

Figure 1:
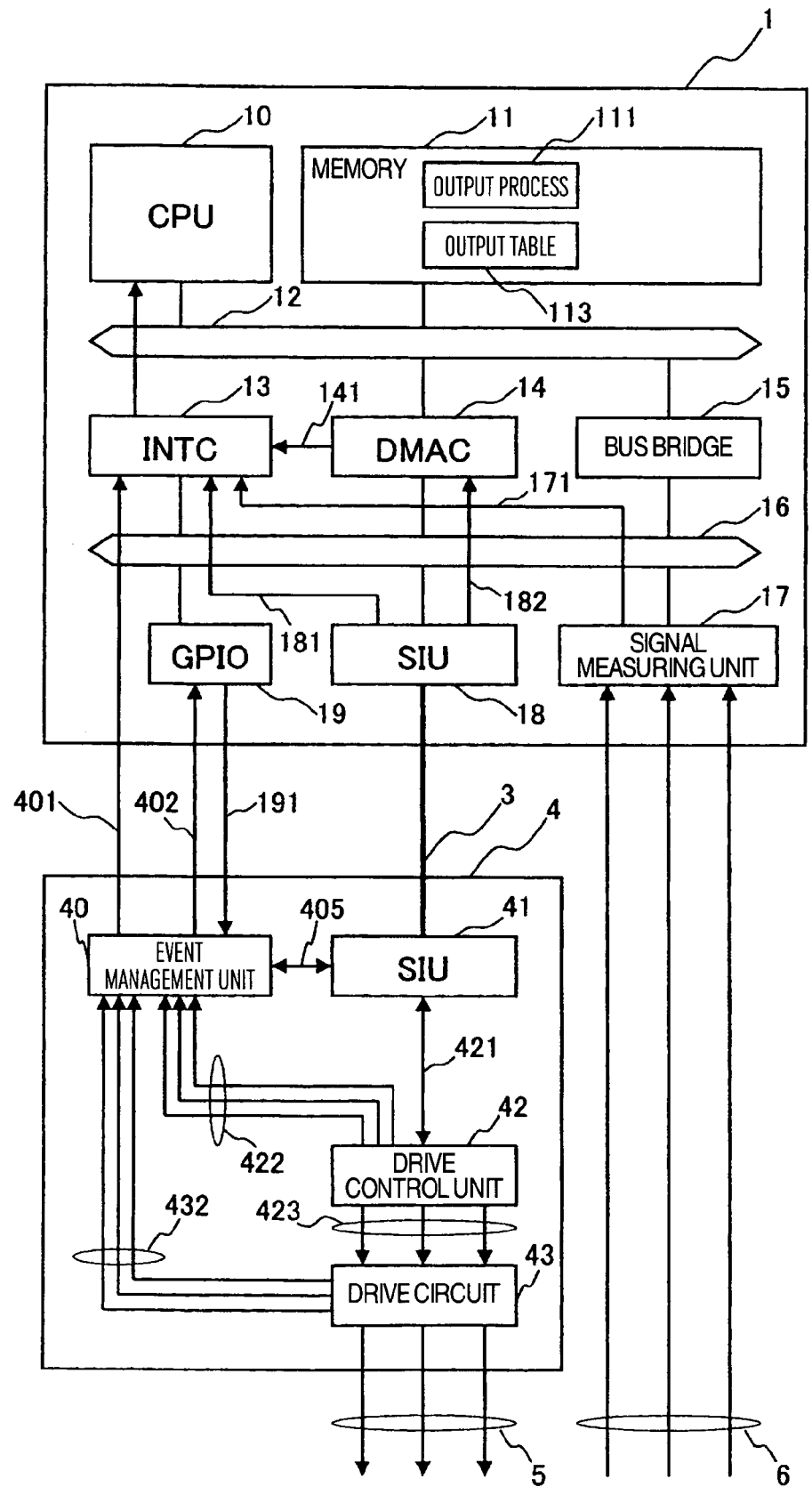
FIG. 1 is a block diagram showing a first basic structure of a vehicle control apparatus according to the present invention.

FIG. 1 is a block diagram showing the first basic structure of the vehicle control apparatus of the present invention. The vehicle control apparatus is constituted of a microcontroller 1 and a driver IC 4. The microcontroller 1 and driver IC 4 may be mounted on the same substrate, may be mounted on different substrates and accommodated in the same housing, or may be mounted on different substrates and accommodated in different housings.

The microcontroller 1 is constituted of a central processor unit (CPU) 10, a memory 11 for storing programs and data, an interrupt control unit (INTC) 13, a direct memory access control unit (DMAC) 14, a bus bridge 15, a signal measuring unit 17, a serial interface unit (SIU) 18 and a general I/O port (GPIO) 19. CPU 10, memory 11 and DMAC 14 are connected to a CPU bus 12. INTC 13, DMAC 14, signal measuring unit 17, SIU 18 and GPIO 19 are connected to a peripheral bus 16. The CPU bus 12 and peripheral bus 16 transfer data via the bus bridge 15. The microcontroller 1 may have an A/D convertor, a watch dog timer and the like (not shown).

The interrupt control unit (INTC) 13 receives interrupt requests from the units in the microcontroller and the external driver IC, and outputs an interrupt signal to CPU 10. INTC 13 has an interrupt factor register (not shown), and upon reception of an interrupt request, sets a corresponding factor flag. By reading this interrupt factor register, CPU 10 can recognize the unit which requested the interrupt.

The direct memory access control unit (DMAC) 14 performs settings for a transfer source address register, a transfer destination address register, a transfer data length and the like (not shown) to execute data transfer between the memory 11 and each unit in the microcontroller, without involvement of CPU 10. Upon completion of data transfer, DMAC 14 outputs an interrupt request signal 141 to CPU 10 to notify CPU 10 of data transfer completion.

The signal measuring unit 17 measures the period and frequency of each pulse signal 6 input from external various sensors, and sequentially writes measurement results in a measurement data register (not shown). CPU 10 can read the measurement results from the measurement data register. The signal measuring unit 17 outputs an interrupt request signal 171 when the measurement data register is updated, to notify CPU 10 of measurement data update.

The serial interface unit (SIU) 18 performs data transmission/reception to/from the external driver IC and the like via a serial line 3 and has a status register and the like including a transmission data register, a reception data register, a transmission completion flag, and a reception completion flag (not shown). Upon completion of data transmission or data reception, SIU 18 outputs an interrupt request signal 181 to notify CPU 10 of data transmission or reception completion. SIU 18 can cooperate with DMAC 14. For data transmission, SIU 18 outputs a DMA request signal 182 to DMAC 14 when the transmission data register becomes empty, and DMAC 14 executes data transfer from the memory to the transmission data register. For data reception, SIU 18 outputs the DMA request signal 182 to DMAC 14 when reception data is loaded in the reception data register, and DMAC 14 executes data transfer from the reception data register in SIU 18 to the memory.

The general I/O port (GPIO) 19 reads the states (High or Low) of one or more digital input signals in a register and writes the states (High or Low) of one or more digital output signals in a register.

The driver IC 4 is constituted of an event management unit 40, a serial interface unit (SIU) 41, a drive control unit 42 and a drive circuit 43.

The event management unit 40 receives an event notice 422 from the drive control unit 42 and an event notice 432 from the drive circuit 43, and outputs an interrupt signal 401 and an event ID 402 to the microcontroller 1.

SIU 41 is connected to SIU 18 of the microcontroller 1 via the serial signal line 3 to perform serial communication between the microcontroller.1 and driver IC 4.

The drive control unit 42 generates a control pulse signal 423 for controlling the drive circuit 43.

The drive circuit 43 generates a drive signal 5 for a control target actuator.

Figure 2:
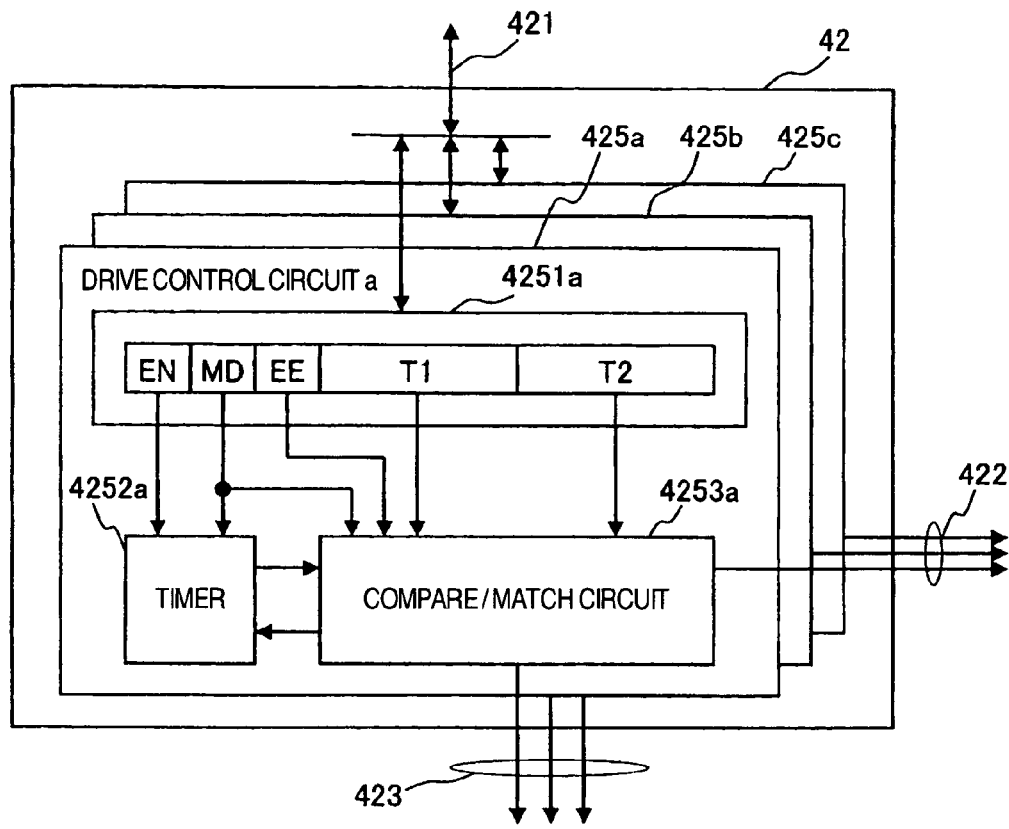
FIG. 2 is a block diagram of a drive control unit 42.

FIG. 2 is a block diagram of the drive control unit.

The drive control unit 42 has three drive control circuits (425a, 425b, 425c) if there are three channels of the control pulse signal 423. The drive control circuit 425s has a control register 4251a, a timer 4252a and a compare/match circuit 4253a. The control register 4251a is constituted of an output enable flag (EN), a mode flag (MD), an event notice enable flag (EE), an output compare 1 (T1) and an output compare 2 (T2). EN controls start/stop of the timer 4252a, "0" for stop and "1" for start. MD sets an operation mode of the timer 4252a, "0" for a single mode and "1" for a continuous mode. EE sets whether the event occurrence signal 422 is output or not when a compare/match occurs, "0" for no-output and "1" for output. T1 and T2 set a fall time and a rise time of the control pulse signal 423 to be output. In this embodiment, T1 sets the fall time and T2 sets the rise time.

The timer 4252a generates a reference time to be used for generating the control pulse signal 423. If MD in the control register 4251a is set to the single mode, the timer starts incrementing a timer value when "1" is set to EN in the register, and when the timer value becomes coincident with T2, the timer value is cleared to "0" to stop incrementing. If MD in the control register 4251a is set to the continuous mode, the timer starts incrementing a timer value when "1" is set to EN in the register, and when the timer value becomes coincident with T2, the timer value is cleared to "0" to thereafter resume incrementing repetitively.

The compare/match circuit 4253a compares the timer value of the timer 4252a with the values T1 and T2 in the control register 4251a, changes the control pulse signal 423 from High to Low when the timer value becomes coincident with T1, and changes the control pulse signal 423 from Low to High when the timer value becomes coincident with T2.

Figure 3:
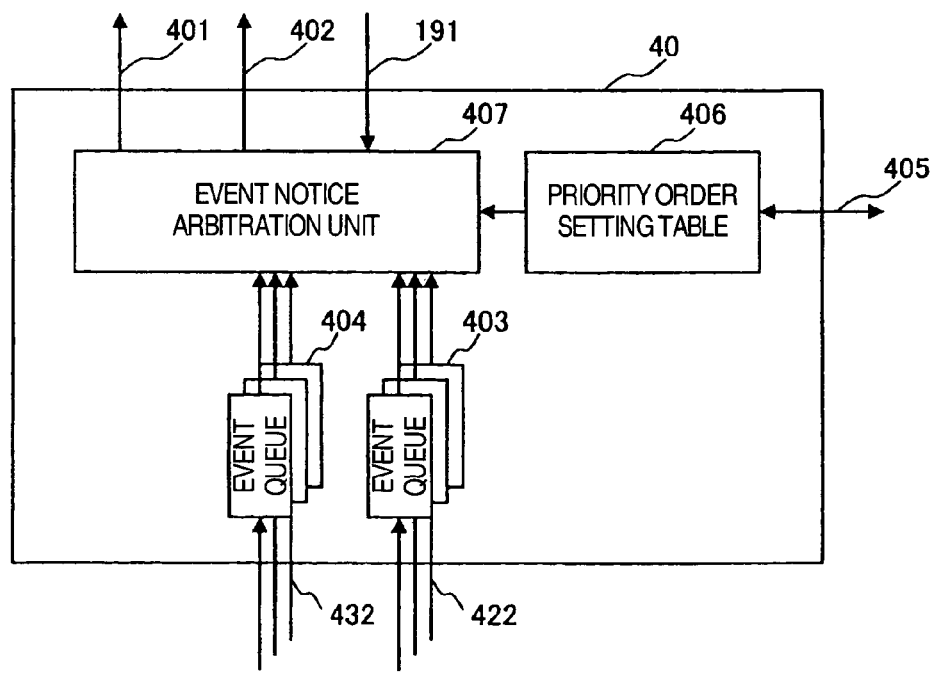
FIG. 3 is a block diagram of an event management unit 40.
Figure 4:
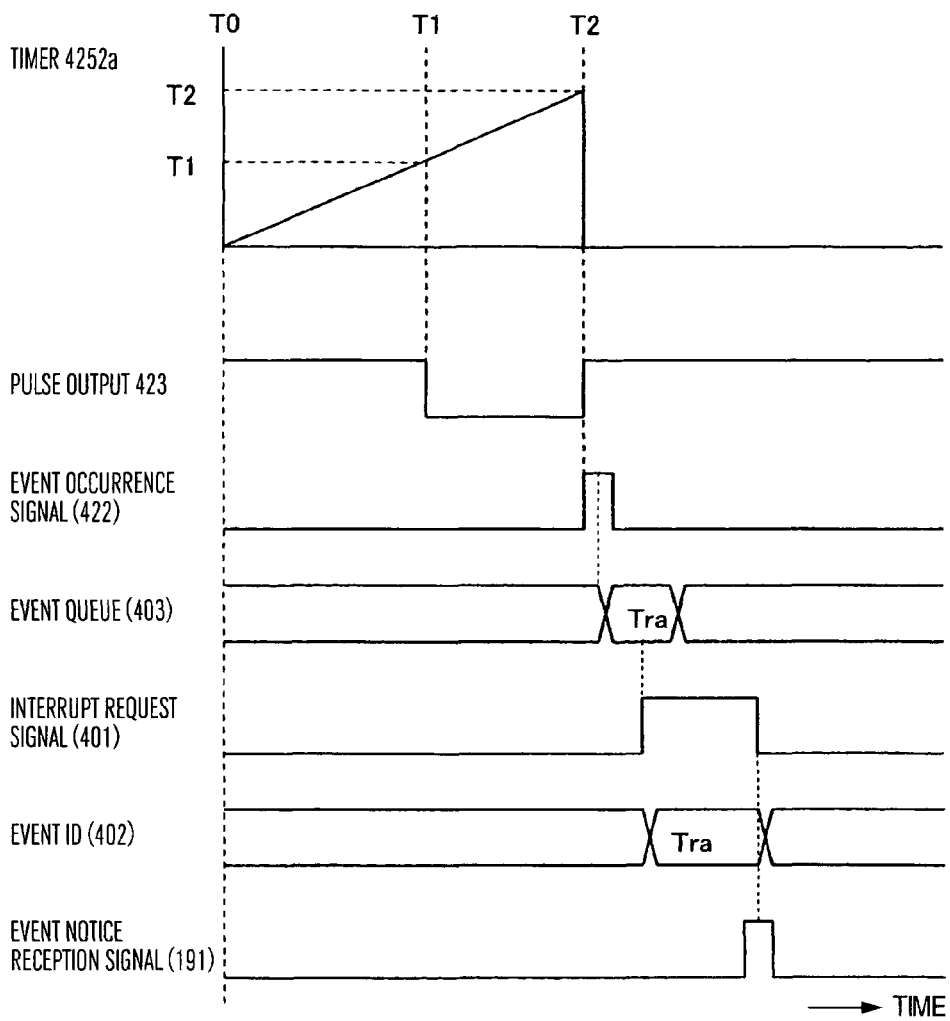
FIGS. 4A to 4G are timing charts illustrating the operations of the drive control unit 42 and event management unit 40.
Figure 5:
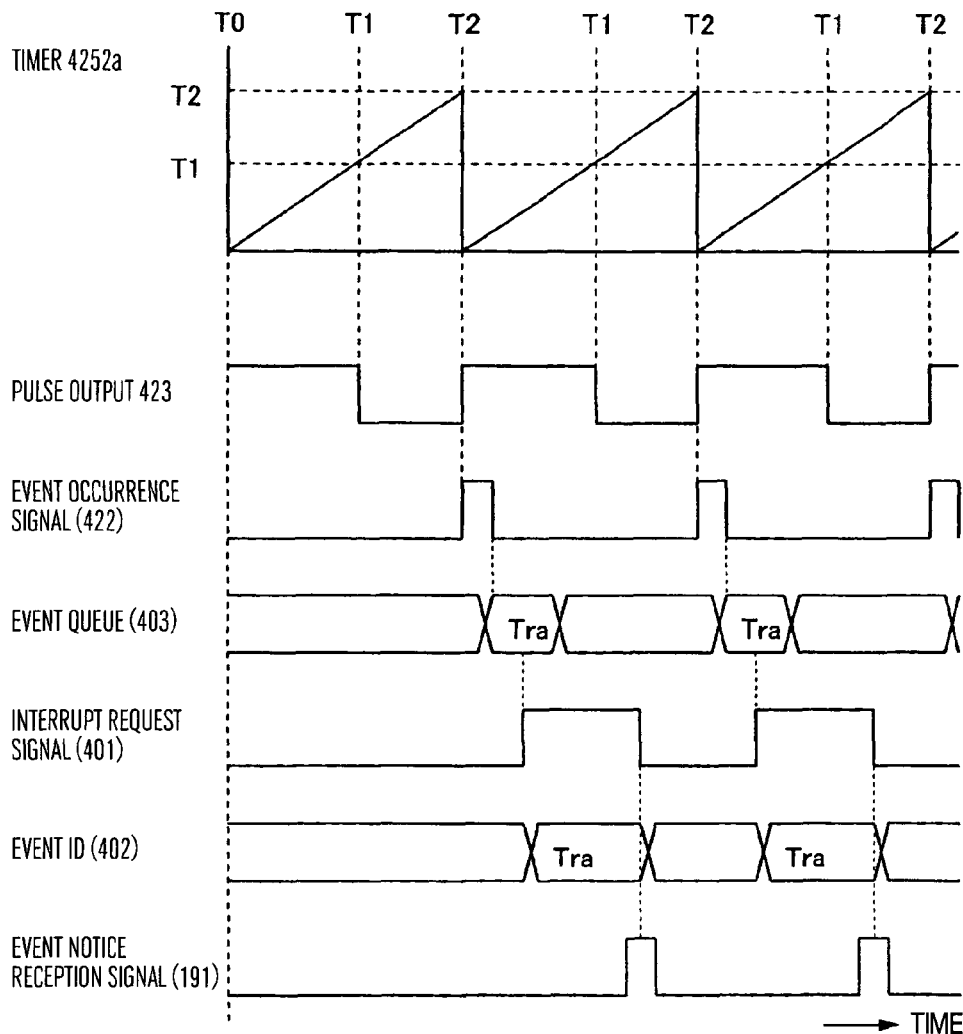
FIGS. 5A to 5G are timing charts illustrating the operations of the drive control unit 42 and event management unit 40.

FIG. 3 is a block diagram of the event management unit 40.

The event management unit 40 is equipped with: a priority order setting table 406 for setting a priority order in notifying the microcontroller of event notices from the drive control unit 42 and drive circuit 43; an event notice arbitration unit 407 for arbitrating the event notices from the drive control unit 42 and drive circuit 43 in accordance with the priority order setting table, and notifying the microcontroller 1 of an event notice; and event queues 403 and 404 for queuing the event occurrence signals 422 and 432 from the drive control unit 42 and drive circuit 43.

The priority order setting table 406 can be set by CPU 10 of the microcontroller 1 via serial communications.

The event notice arbitration unit 407 refers to the priority order setting table 406 to select an event having a highest priority order among events queued in the event queues 403 and 404, and outputs the interrupt request signal 401 and event ID 402 to the microcontroller 1. In the microcontroller 1, INTC 13 receives the interrupt request signal 401, and GPIO 19 receives the event ID 402. The microcontroller outputs an event notice reception signal 191 via GPIO 19. Upon reception of the event notice reception signal 191, the event notice arbitration unit 407 arbitrates new event notices.

Each of the event queues 403 and 404 is a FIFO buffer prepared for each channel of the drive control unit 42 and drive circuit 43.

FIGS. 4A to 4G are timing chart illustrating the operations of the drive control unit 42 and event management unit 40. It is assumed herein that the operation mode of the timer 4252a is the single mode.

The timer 4252a starts incrementing a timer value when "1" is set to EN in the control register 4251a, and when the timer value becomes coincident with T2, the timer value is cleared to "0" to stop incrementing.

The compare/match circuit 4253a compares the timer value of the timer 4252a with the values T1 and T2 in the control register 4251a, changes the control pulse signal 423 from High to Low when the timer value becomes coincident with T1, changes the control pulse signal 423 from Low to High and outputs the event occurrence signal 422 when the timer value becomes coincident with T2.

The event queue 403 queues each occurred event.

The event notice arbitration unit 407 selects an event from the event queue 403, and outputs the interrupt request signal 401 and event ID 402 to the microcontroller 1. In the microcontroller 1, INTC 13 receives the interrupt request signal 401, and GPIO 19 receives the event ID 402.

Upon reception of the interrupt request signal 401, INTC. 13 issues an interrupt to CPU 10, and CPU 10 outputs the event notice reception signal 191 via GPIO 19 in the interrupt process. Upon reception of the event notice reception signal 191, the event notice arbitration unit 407 completes the output of the interrupt request signal 401 and event ID 402, and arbitrates new event notices.

FIGS. 5A to 5G are timing charts illustrating the operations of the drive control unit 42 and event management unit 40. It is assumed herein that the operation mode of the timer 4252a is the continuous mode. The fundamental operation is the same as that of the single mode shown in FIGS. 4A to 4G. A different point resides in that when the timer value of the timer 4252a becomes coincident with the value T2, the timer value is cleared to "0" to resume incrementing.

FIG. 6 is a block diagram of the signal measuring unit 17 of the microcontroller 1.

The signal measuring unit 17 has three signal measuring circuits (175a, 175b and 175c) if there are three channels of the pulse signal 6 from the sensors and the like.

The signal measuring circuit 175a has a control register 1751a, a timer 1752a and an input capture circuit 1753a. The control register 1751a is constituted of a measuring enable flag (EN), a mode flag (MD), an event notice enable flag (EE), an input capture 1 (T1) and an input capture 2 (T2). EN controls execution/no-execution of signal measuring, "0" for execution and "1" for no-execution. MD sets an operation mode of the timer 1752a, "0" for a single mode and "1" for a free-run mode. EE sets whether the interrupt request signal 171 is output or not during input capture, "0" for no-output and "1" for output. Ti stores a timer value at the fall of the pulse signal 6, and T2 stores a timer value at the rise of the pulse signal 6.

If EN in the control register 1751a is set to the execution and MD is set to the single mode, the input capture circuit 1753a stores the timer value at the fall of the pulse signal 6 in T1, stores the timer value at the rise of the pulse signal in T2, and thereafter clears the timer value to "0" to resume incrementing repetitively. If EN in the control register 1751a is set to the execution and MD is set to the free-run mode, the input capture circuit 1753a stores the timer value at the fall of the pulse signal 6 in T1 and stores the timer value at the rise of the pulse signal in T2. This operation is repetitively performed. In the free-run mode, the timer value is not cleared to "0" until the timer 1752a overflows. If EE is set to the interrupt request signal output, the input capture circuit 1753a outputs the interrupt request signal 171 when the timer value at the rise of the pulse signal 6 is stored in T2.

FIGS. 7A to 7E are timing charts illustrating the signal measuring unit 17. It is herein assumed that the operation mode is the single mode.

The input capture circuit 1753a stores the timer value at the fall of the pulse signal 6 in T1, stores the timer value at the rise of the pulse signal 6 in T2, and thereafter clears the timer value of the timer 1752a to "0" to resume incrementing. The input capture circuit outputs the interrupt request signal 171 at the rise of the pulse signal 6.

Figure 8:
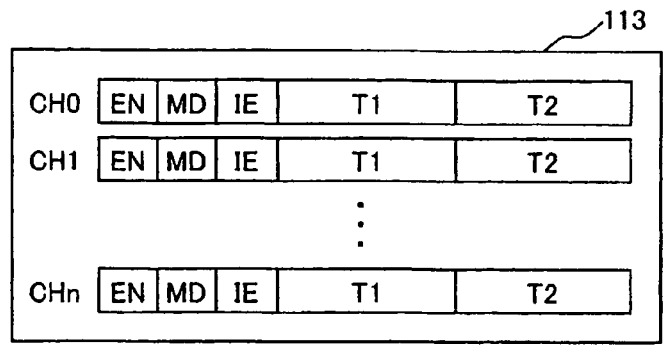
FIG. 8 is a diagram showing an output table 111 stored in a memory 11.

FIG. 8 is a diagram showing an output table 113 stored in the memory 11.

The output table 113 is a copy of the control register 4251x (x is 1, 2, . . . , n) in the drive control unit 42 of the driver IC 4. In an output process 111, control register values in the output table 113 are written in the control register 4251x, so that application software running on CPU 10 can operate the drive signal 5 of the driver IC simply by overwriting the output table 113.

Figure 9:
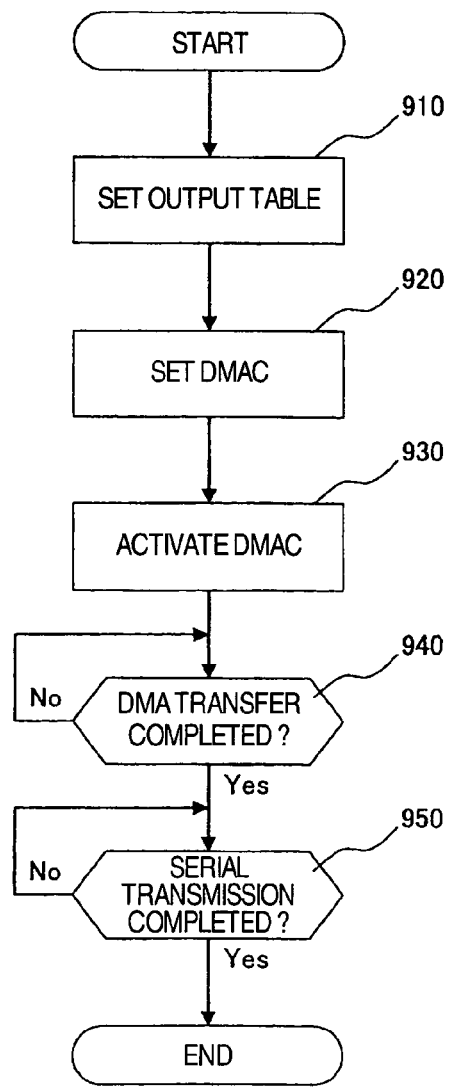
FIG. 9 is a flow chart illustrating an output process 111 to be executed by a CPU 10.

FIG. 9 is a flow chart illustrating the output process 111 to be executed by CPU 10.

In the output process 111, a control register value of the target channel is first set to the output table 113 (910), and then the transfer source address register, transfer destination address register, transfer data length and the like in DMAC 14 are set to DMA transfer the control register value of the target channel from the memory 11 to the transmission data register in SIU 18 (920), and DMA transfer of DMAC 14 is activated (930). Thereafter, the transfer completion flag of DMAC 14 and the serial transmission completion flag of SIU 18 are polled to terminate the process after completion of DMA transfer and serial transmission (940, 950).

In the first basic structure described above, the output process 111 executed by CPU 10 performs input/output management of data between the drive control unit 42 as a signal input unit or signal output unit and the memory 11 as a storage unit.

Figure 10:
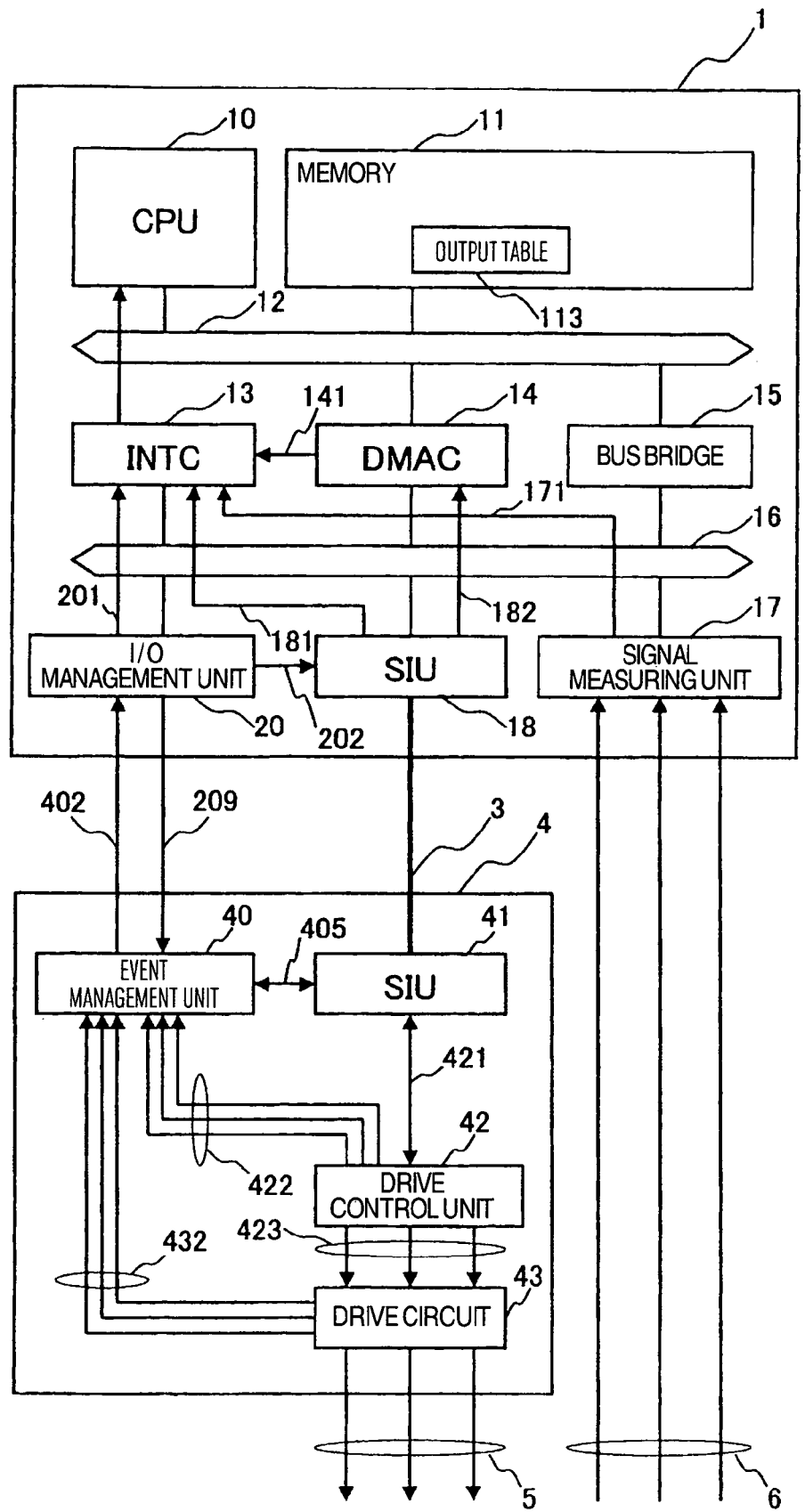
FIG. 10 is a block diagram showing a second basic structure of the vehicle control apparatus according to the present invention.

FIG. 10 is a block diagram showing the second basic structure of the vehicle control apparatus of the present invention. The vehicle control apparatus is fundamentally the same as that of the first embodiment. A different point resides in that the microcontroller 1 is equipped with an I/O management unit 20. The microcontroller 1 may have an A/D converter, a watch dog timer, a general I/O port (GPIO) and the like (not shown).

The I/O management unit 20 manages I/O via serial communications in accordance with the event ID 402 output from the event management unit 40 and a request from CPU 10.

Figure 11:
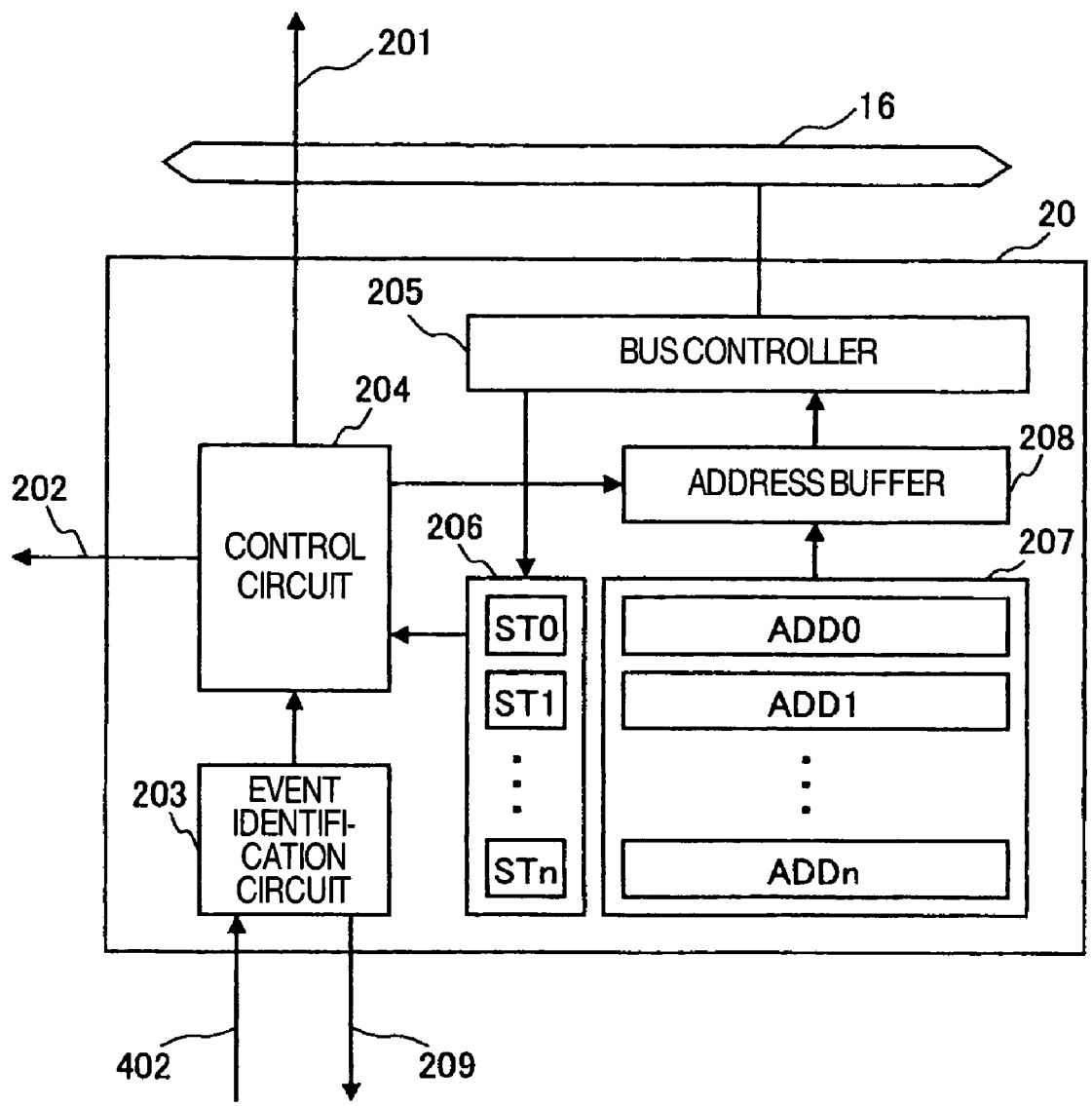
FIG. 11 is a block diagram of an I/O management unit 20.

FIG. 11 is a block diagram of the I/O management unit 20.

The I/O management unit 20 is constituted of: an event identification circuit 203 for receiving the event ID 402 and identifying which event occurred; a data transfer request register; a control circuit 204 for realizing data transfer between the memory 11 and driver IC 4 by using DMAC 14 and SIU 18, in accordance with the identification result by the event identification circuit 203 and settings in the data transfer request register 206; a transfer address register 207 for loading an address of the memory 11 for a data transfer target; an address buffer 208 for reading the transfer target address and temporarily loading it therein; and a bus controller 205 for controlling data transfer via the peripheral bus 16.

The transfer address resister 207 can set a plurality of addresses which are assigned to an event notified from the driver IC 4 and one or more data transfer request flags in the data transfer request register 206.

If the event identification circuit 203 identifies an event from the driver IC 4 or if CPU 10 sets the data transfer request flag in the data transfer request register 206, the control circuit 204 stores the address in the transfer address register corresponding to the event or data transfer request flag in the address buffer, writes it in the transfer source address register in DMAC 14 via the bus controller 205, activates DMA transfer by DMAC 14, and writes the control register value of the target channel in the output table 113 in the memory into the control register 4251x (x=1, 2, . . . , n) in the drive control unit 42 of the driver IC 4 through data transfer via SIU 18. Application program running on CPU 10 can operate the drive signal 5 of the driver IC 4 only by overwriting the output table 113, and the output process by CPU 10 is not necessary.

Figure 12:
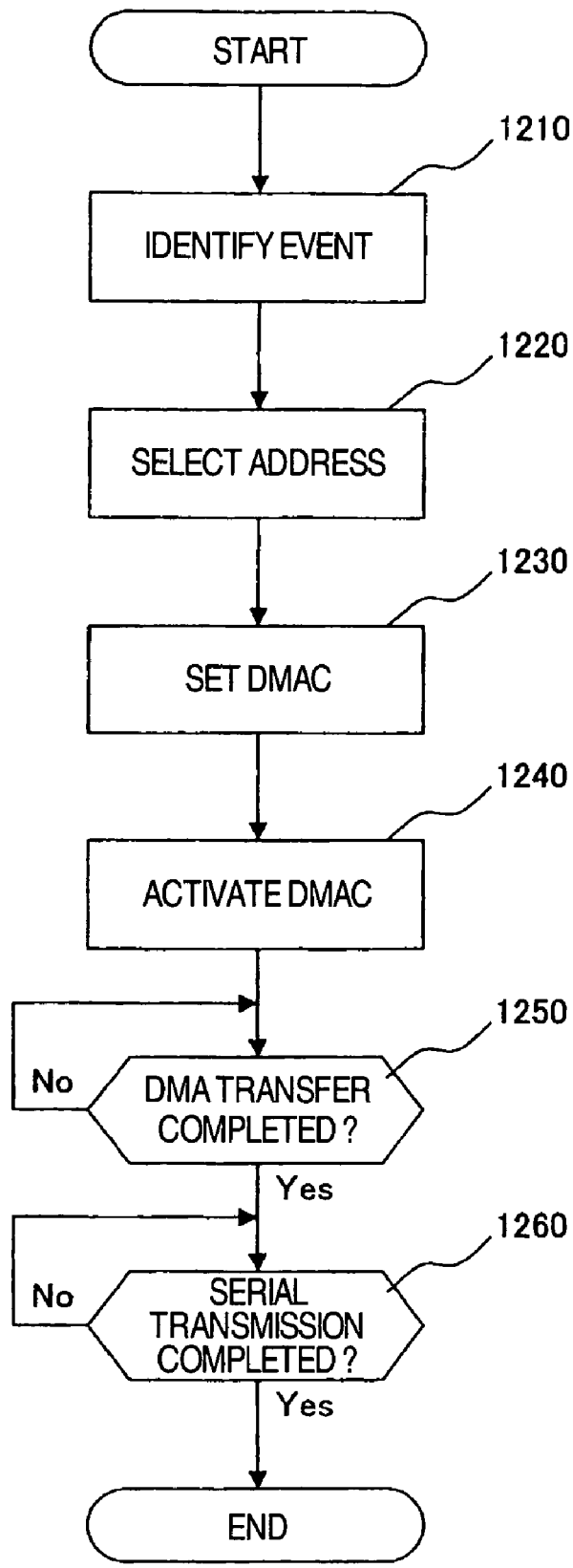
FIG. 12 is a flow chart illustrating an output process to be executed by the I/O management unit 20.

FIG. 12 is a flow chart illustrating the output process to be executed by the I/O management unit 20.

First, the event identification circuit 203 identifies an event from the driver IC 4 or CPU detects that the data transfer request flag in the data transfer request register 206 is set (1210), and an address of the transfer address register 207 corresponding to the detected event or data transfer request flag is loaded in the address buffer 208 (1220), and thereafter written in the transfer source address register in DMAC 14 via the bus controller 205 (1230). DMA transfer of DMAC 14 is activated to write the control register value of the target channel in the output table 113 in the memory 11, in the control register 4251x (x=1, 2, . . . , n) in the drive controller 42 of the driver IC 4 (1240). Thereafter, the transfer completion flag of DMAC 14 and the serial transmission completion flag of SIU 18 are polled to terminate the process after completion of DMA transfer and serial transmission (1250, 1260).

Figure 13:
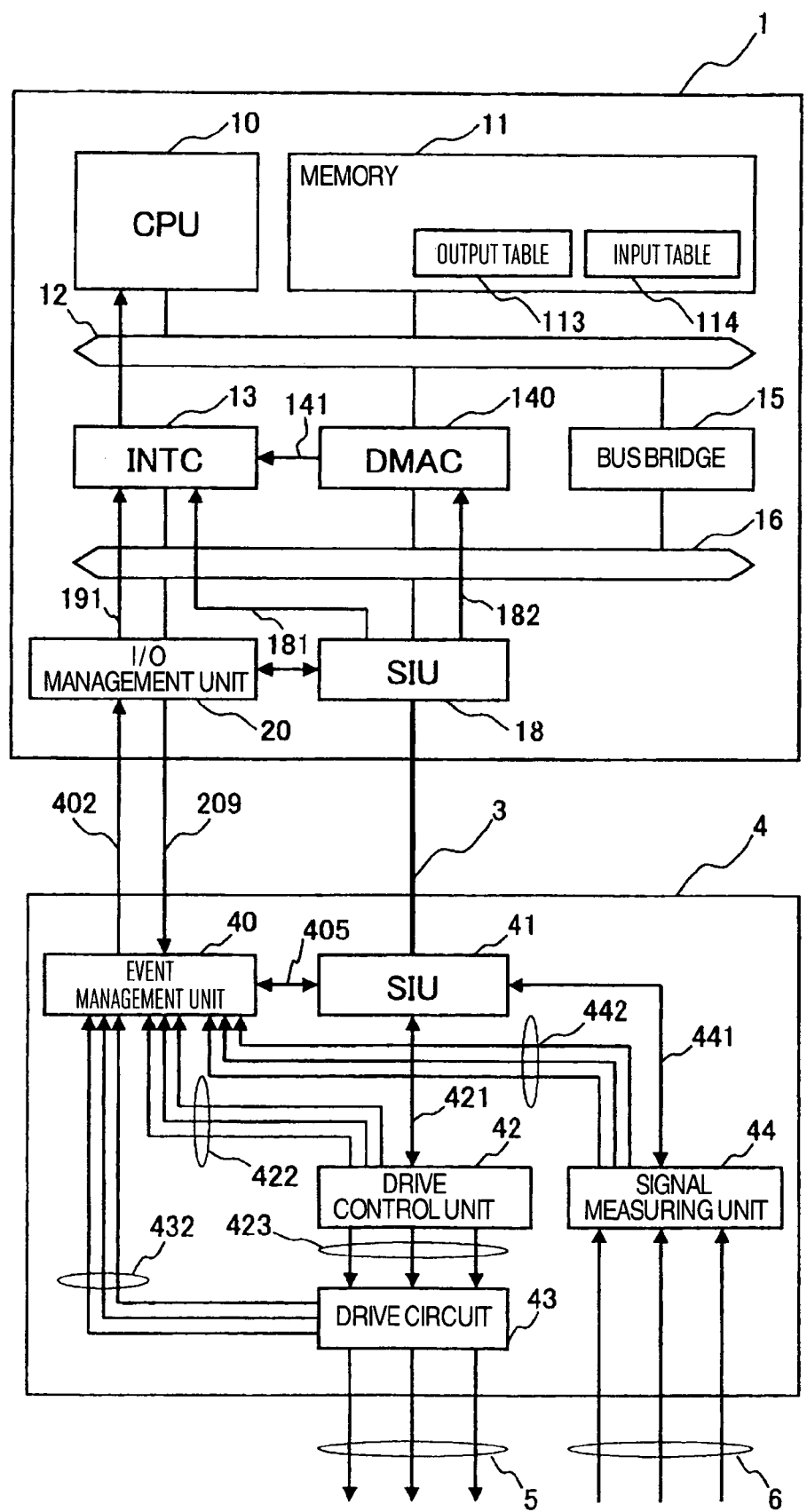
FIG. 13 is a block diagram showing a third basic structure of the vehicle control apparatus according to the present invention.

FIG. 13 is a block diagram showing the third basic structure of the vehicle control apparatus of the present invention. The vehicle control apparatus is fundamentally the same as that of the second embodiment shown in FIG. 11. A different point resides in that the driver IC 4 has a signal measuring unit 44. The microcontroller 1 may have an A/D converter, a watch dog timer, a general I/O port (GPIO), a signal measuring unit and the like (not shown).

Figure 14:
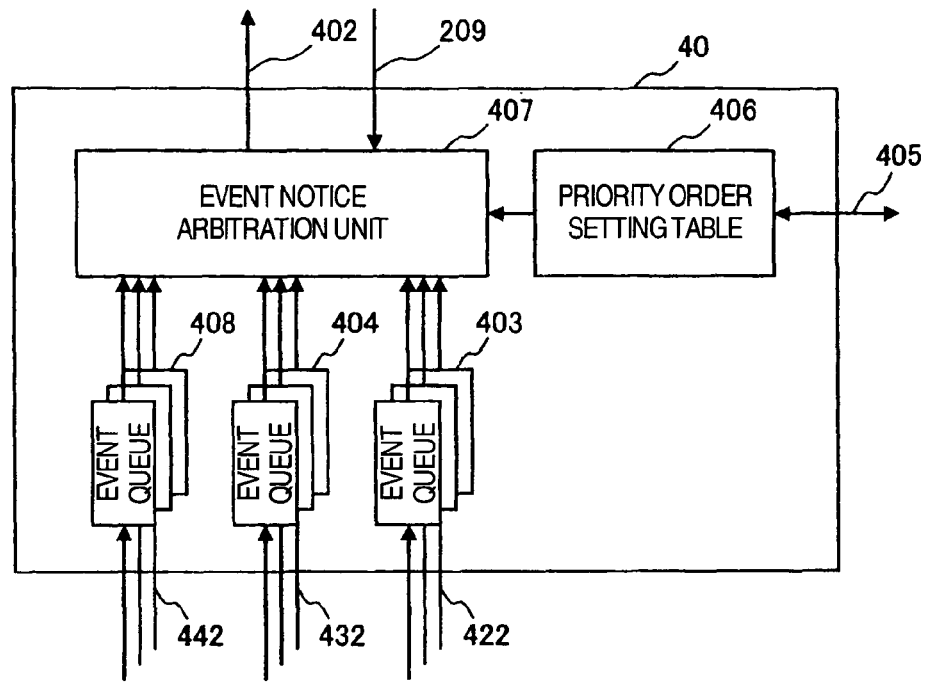
FIG. 14 is a block diagram of the event management unit 40.

FIG. 14 is a block diagram of the event management unit 40. The event management unit 40 is fundamentally the same as that shown in FIG. 3. A different point resides in that an event queue 408 is added for queuing the event occurrence signal 442 from the signal measuring unit 44.

Figure 15:
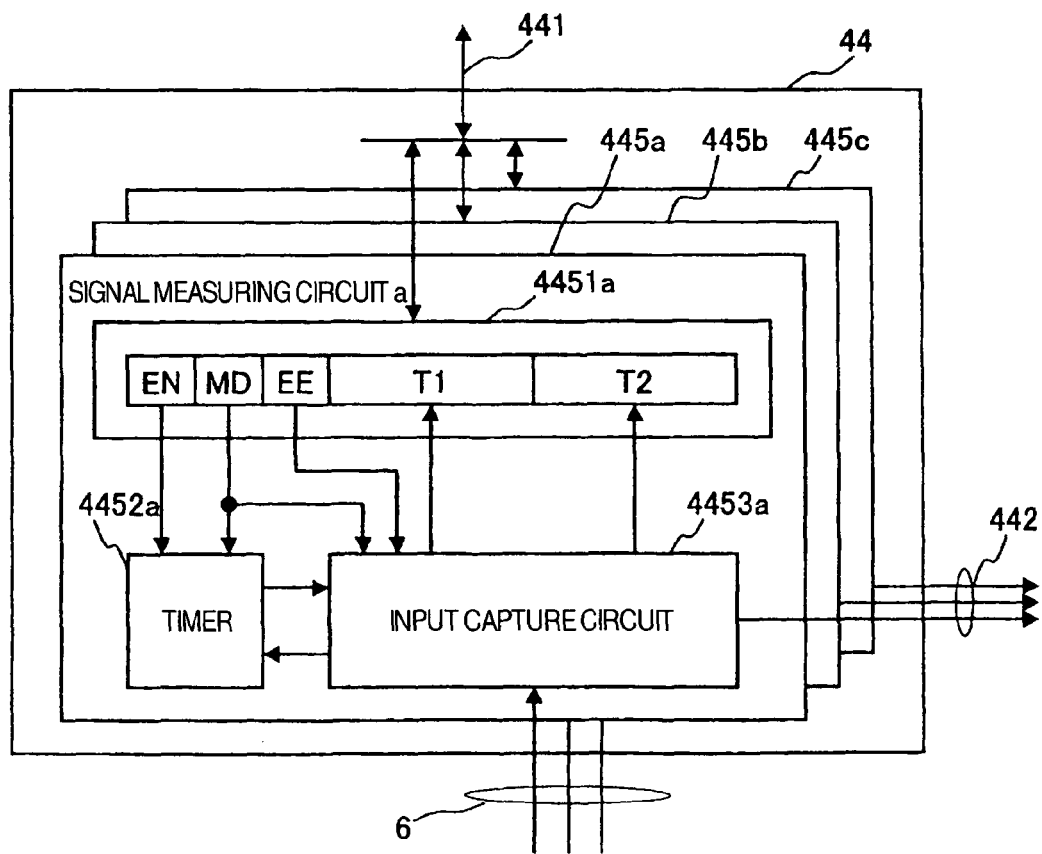
FIG. 15 is a block diagram of a signal measuring unit 44.

FIG. 15 is a block diagram of the signal measuring unit 44. The signal measuring unit 44 is fundamentally the same as the signal measuring unit 17 shown in FIG. 6. A different point resides in that the signal measuring unit outputs an event occurrence signal 442 instead of the interrupt request signal.

Figure 16A:
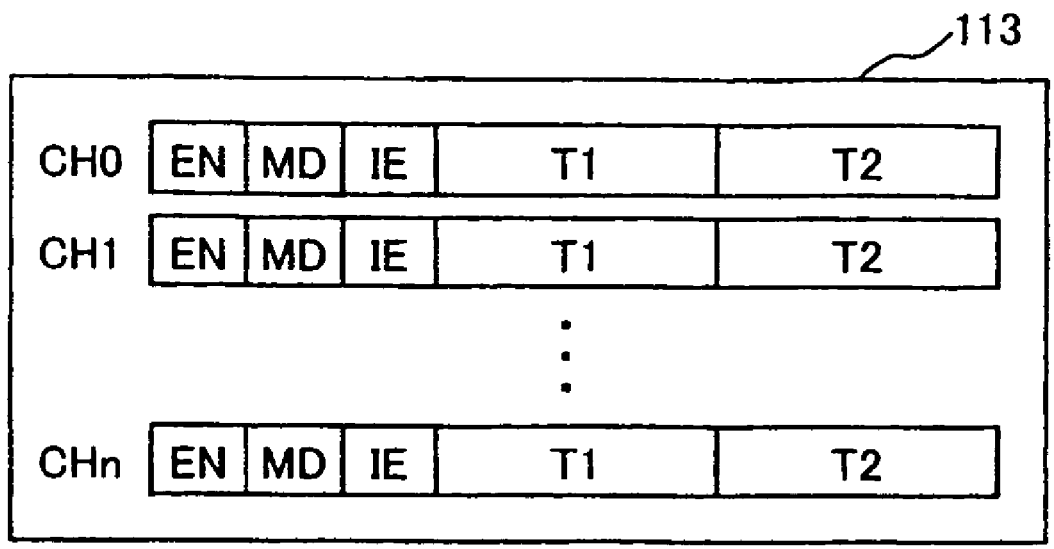
FIGS. 16A and 16B are diagrams showing the output table 113 and an input table 114 stored in the memory 11, respectively.
Figure 16B:
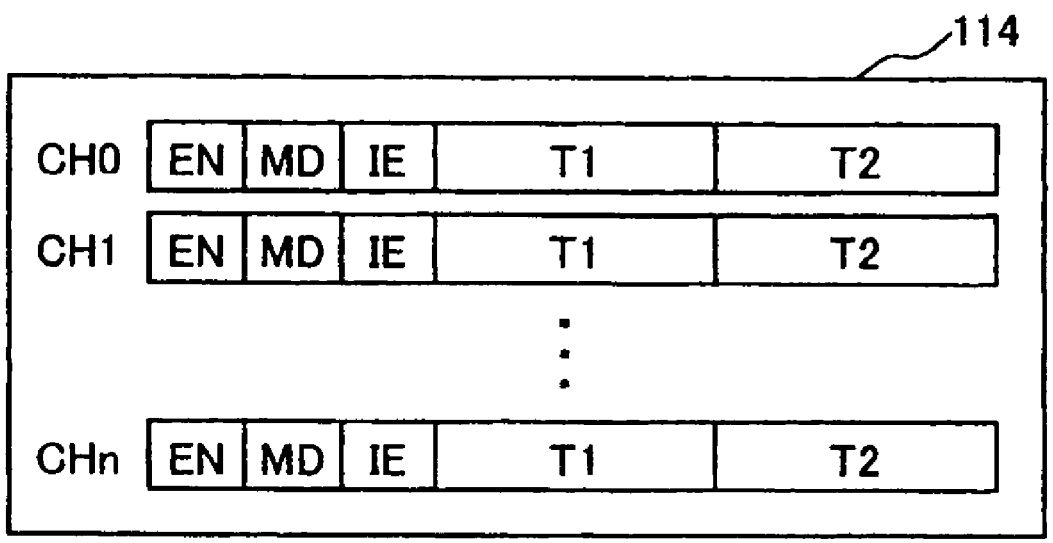

FIGS. 16A and 16B are diagrams showing an output table 113 and an input table 114 stored in the memory 11, respectively.

The output table 113 is a copy of the control register 4251x (x=1, 2, . . . , n) in the drive control unit 42 of the driver IC 4. As the I/O management unit 20 writes the control register value in the output table 113 in the control register 4251x, application software running on CPU 10 can operate the drive signal 5 in the driver IC 4 only by overwriting the output table 113.

The input table 114 is a copy of the control register 4451x (x=1, 2, . . . , n) in the signal measuring unit 44 of the driver IC 4. As the I/O management unit 20 writes the control register value in the control register 4451x in the input table 114, application software running on CPU 10 can read the measurement result from the input table 114, and the input process by CPU 10 is not necessary.

According to the embodiments described above, in the vehicle control apparatus having the microcontroller and driver IC interconnected by a serial communication line, the driver IC is equipped with the event management unit, and a copy of the control register of the driver IC is realized on the memory of the microcontroller. Accordingly, application software can perform I/O operations and data read by normal memory access without accessing the driver IC. Since the microcontroller is equipped with the I/O management unit, the input/output process by CPU is not necessary so that a load on CPU can be reduced.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A vehicle control apparatus comprising:
an arithmetic processing unit including an arithmetic unit, a storage unit and a first communication unit;
an input/output unit including a signal input unit or a signal output unit and a second communication unit; and
a serial communication line connecting said arithmetic processing unit and said input/output unit;
wherein:
said input/output unit is equipped with an event management unit for detecting an event of a signal input or a signal output and notifying said event to said arithmetic processing unit; and
said arithmetic processing unit is equipped with an input/output management unit for performing data exchange between said signal input unit or said signal output unit and said storage unit, via said first and second communication units, in accordance with a request from said arithmetic unit and an event notice from said event management unit.

2. The vehicle control apparatus according to claim 1, wherein:
said input/output management unit transfers information externally detected by said signal input unit to said storage unit, or transfers a signal output command stored in said storage unit to said signal output unit, in accordance with the request from said arithmetic unit and the event notice from said event management unit; and
said arithmetic unit reads information on said signal input unit stored in said storage unit or writes the signal output command to said signal output unit in said storage unit.

3. The vehicle control apparatus according to claim 1, wherein:
said arithmetic processing unit includes a data transfer unit; and
said input/output management unit supplies said data transfer unit with a command for data transfer between said storage unit and said input/output unit via said first and second communication units.

4. An input/output apparatus for a vehicle control apparatus, the input/output apparatus connected to an arithmetic processing unit of a vehicle control apparatus by a serial communication path, comprising:
a signal input unit or a signal output unit;
a communication unit; and
an event management unit; wherein:
said event management unit detects an event of a signal input or a signal output to said arithmetic processing unit via said communication unit; and
at least one of said signal input unit and said signal output unit performs data exchange with said arithmetic processing unit in accordance with an event notice from said event management unit.

5. The input/output apparatus for a vehicle control apparatus according to claim 4, wherein said event management unit notifies said event by outputting an interrupt signal and an event identification signal to said arithmetic processing unit.

6. The input/output apparatus for a vehicle control apparatus according to claim 5, wherein said event management unit sets a priority order for each of said events, and notifies said event in accordance with said priority order.

7. The input/output apparatus for a vehicle control apparatus according to claim 4, wherein said event management unit sets a priority order for each of said events, and notifies said event in accordance with said priority order.

* * * * *